US012218473B2

(12) United States Patent
Brandt et al.

(10) Patent No.: US 12,218,473 B2
(45) Date of Patent: Feb. 4, 2025

(54) METHOD FOR CONFIGURING AN ELECTRICAL CONTACT ZONE ON/IN A TERMINAL, AND ELECTRICAL TERMINAL

(71) Applicant: TE Connectivity Germany GmbH, Bensheim (DE)

(72) Inventors: Jochen Brandt, Woert (DE); Isabell Buresch, Woert (DE); Thomas Steinacker, Woert (DE); Ruediger Meier, Bensheim (DE); Christian Bergmann, Woert (DE)

(73) Assignee: TE Connectivity Germany GmbH, Bensheim (DE)

( * ) Notice: Subject to any disclaimer, the term of this patent is extended or adjusted under 35 U.S.C. 154(b) by 174 days.

(21) Appl. No.: 17/313,530

(22) Filed: May 6, 2021

(65) Prior Publication Data

US 2021/0352804 A1 Nov. 11, 2021

(30) Foreign Application Priority Data

May 8, 2020 (DE) .................... 10 2020 112 561.5

(51) Int. Cl.
*H01R 4/58* (2006.01)

(52) U.S. Cl.
CPC .................................... *H01R 4/58* (2013.01)

(58) Field of Classification Search
CPC ................................ H01R 4/58; H01R 4/188
See application file for complete search history.

(56) References Cited

U.S. PATENT DOCUMENTS

| | | | | |
|---|---|---|---|---|
| 5,653,598 A * | 8/1997 | Grabbe | H05K 7/1069 439/74 |
| 10,158,200 B2 * | 12/2018 | Miyazaki | H01R 12/75 |
| 2020/0220291 A1 * | 7/2020 | Ho | H01R 12/57 |

* cited by examiner

*Primary Examiner* — Ross N Gushi
(74) *Attorney, Agent, or Firm* — Barley Snyder

(57) ABSTRACT

A method for configuring an electrical contact zone of a terminal includes providing the terminal having a contact portion extending in a longitudinal direction of the terminal, forming a contact dome having a radius in the contact portion of the terminal, and forming a contact zone in the terminal at the contact dome. The contact zone is formed subsequent to a start of the step of forming the contact dome.

10 Claims, 6 Drawing Sheets

II

METHOD FOR CONFIGURING AN ELECTRICAL CONTACT ZONE ON/IN A TERMINAL, AND ELECTRICAL TERMINAL

CROSS-REFERENCE TO RELATED APPLICATIONS

This application claims the benefit of the filing date under 35 U.S.C. § 119(a)-(d) of German Patent Application No. 102020112561.5, filed on May 8, 2020.

FIELD OF THE INVENTION

The present invention relates to an electrical terminal and, more particularly, to an electrical contact zone of an electrical terminal.

BACKGROUND

There are known in the electrical field (electronics, electrical engineering, electrics, electrical power engineering, etc.), a large number of disconnectable electrical connector devices, or connector elements, socket, pin and/or hybrid connectors, etc.—hereinafter referred to as (electrical) connectors (also: counter-connectors)—that serve to transmit electrical currents, voltages, signals and/or data with a wide range of currents, voltages, frequencies and/or data rates. In the low, medium or high voltage and/or current range, such connectors have to ensure, permanently, repeatedly and/or after a comparatively long period of inactivity, a transmission of electrical power, signals and/or data for a short time in mechanically stressed, warm, possibly hot, contaminated, humid and/or chemically aggressive environments. A wide range of applications means that a large number of specially designed connectors are known.

Such a connector and, if applicable, its associated (e.g. in the case of a connector device or a connector element) or superordinate (e.g. in the case of a connector element) housing may be fitted to an electrical line, a cable, a cable harness etc.—hereinafter referred to as an assembled (electrical) cable (also: electrical entity)—, or to/in an electrical device, such as, for example, to/in a housing, to/on a leadframe, to/on a printed circuit board etc., a (power) electrical, electro-optical, or electronic, component, or a corresponding aggregation, etc. (electrical entity).

If a connector (with/without housing) is located on a cable, line, or wiring harness, it is also referred to as a floating (plug in) connector, or plug, socket or coupling; if it is located on/in an electrical, electro-optical, or electronic, component, aggregation, etc., it is also referred to as a (connector element such as, for example, an (internally/externally mounted) connector, an (internally/externally mounted) plug or an (internally/externally mounted) socket. Further, a connector on such an element is often also referred to as a (plug) receiver, pin header, pin strip or header. In the context of electrical power engineering (generation, conversion, storage, transport and retransmission of electrical power current in electrical networks, for example with three-phase high-voltage transmission), the term cable sets is used, owing to their comparatively complex structure.

Such a connector must be capable of providing faultless transmission of electricity or signals, with mutually corresponding and partially complementary connectors (connector and counter-connector) usually have locking elements and/or fastening elements for locking and/or fastening the connector to/in the counter-connector, or vice versa, in a permanent, but usually disconnectable, manner. Further, an electrical connection element for a connector, e.g. having or comprising an actual contact device (terminal; usually realized materially in one piece or integrally, e.g. a contact element etc.) or a contact element (terminal; usually multipart, two-part, one-piece, realized materially in one piece or integrally, e.g. a one-part or multi-part (crimp) contact element), must be securely accommodated therein. In the case of a (pre-)assembled electrical cable, such a connection element may be provided as a connector (cf. above), i.e. without a housing, e.g. floating.

Improvement in electrical connectors and their terminals is constantly sought, in particular to design them more effectively and to design and/or produce them more cost-effectively. Bending of an electrical contact zone that comprises an electromechanical contact dome having a radius, in particular an outer radius, of an electrical terminal, in particular a contact lamella or a contact spring of a terminal, results in fissures, delaminations and/or cracks, in particular in a central region on the outer radius of a material or a composite material of the contact dome.

In the prior art, as shown in FIG. 2, in the case of single-stage bend forming, deep-drawing forming or stretch forming of a blank to form a contact zone 12 of a contact portion 10 of a terminal 1, i.e. a pair of dome transition regions 110, 130 together with a contact dome 120, fissures, (severe) cracks (dashed-line circles) and/or delaminations occur in a coating/composite material, in particular in a central region at an outer radius R of a material or of a composite material of the contact zone 12 and of the contact dome 120. This negatively affects a plug-in quality of an electrical connection and the reliability from a terminal 1 according to the prior art and a counter-terminal. In the prior art, only a single step is used as a method for configuring the contact zone 12. A single forming step results in a probability of fissures, (severe) cracks and/or delaminations being substantially greater than in the case of the invention explained below.

SUMMARY

A method for configuring an electrical contact zone of a terminal includes providing the terminal having a contact portion extending in a longitudinal direction of the terminal, forming a contact dome having a radius in the contact portion of the terminal, and forming a contact zone in the terminal at the contact dome. The contact zone is formed subsequent to a start of the step of forming the contact dome.

BRIEF DESCRIPTION OF THE DRAWINGS

The invention will now be described by way of example with reference to the accompanying Figures, of which.

DETAILED DESCRIPTION OF THE EMBODIMENT(S)

Figure 2:
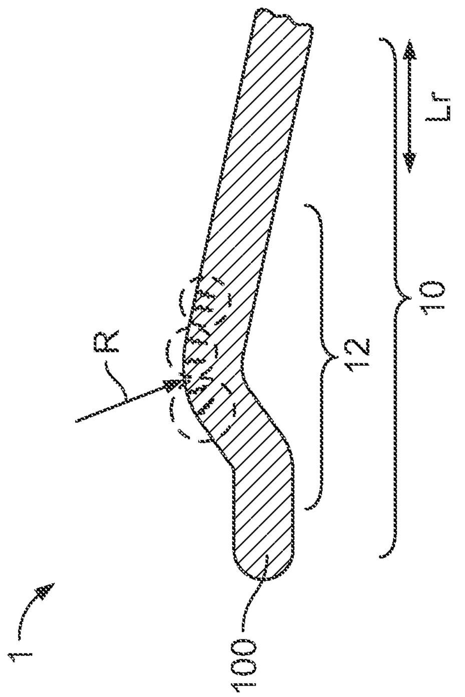
Fig. 2 [Prior Art]
FIG. 2 is a sectional side view of a contact portion of a terminal according to the prior art.

The invention is explained in greater detail in the following on the basis of exemplary embodiments with reference to the appended schematic drawings, which are not to scale. Portions, elements, parts, units, components and/or schematics that are identical, univocal or analogous in their realization and/or function are denoted by the same references in the figures. A possible alternative, a static and/or kinematic inversion, a combination, etc., to the exemplary embodiments of the invention, or of a component, schematic, unit, part, element or portion thereof, which is not explained in the description, is not represented in the drawing, and/or is not exhaustive, may further be taken from the description of the figures.

In the case of the invention, a feature (portion, element, part, unit, component, function, size, etc.) may be positive, i.e. present, or negative, i.e. absent. In this specification, a negative feature is not explicitly explained as a feature, unless according to the invention it is emphasized that it is absent. In other words, the invention actually made, and not one constructed by the prior art, consists in omission of that feature.

A feature of this specification may be applied not only in a stated manner and/or way, but also in another manner and/or way (isolation, summary, substitution, addition, singularity, omission, etc.). In particular it is possible, on the basis of a reference and a feature associated therewith, or vice versa, in the description, the claims and or the drawings, to replace, add or omit a feature in the claims and/or the description. Moreover, a feature can thereby be explained and/or specified in greater detail in a claim.

The features of the description may also be interpreted as optional, i.e. each feature may be regarded as an optional or arbitrary feature, i.e. as a non-binding feature. Thus, it is possible to extract a feature, possibly including its periphery, from an exemplary embodiment, this feature then being transferable to a generalized inventive concept. The absence of a feature (negative feature) in an exemplary embodiment shows that the feature is optional with regard to the invention. Further, in the case of a specific term for a feature, a generic term for the feature can also be included (possibly further hierarchical subdivision into subgenus, etc.), whereby, for example, taking account of equal effect and/or equivalence, a generalization of the feature is possible.

The invention is explained in greater detail in the following on the basis of three exemplary embodiments (FIGS. 3 to 6, and FIGS. 7 and 8, FIGS. 10 and 11) of a variant of an electromechanical contact portion 10, in particular a contact lamella 10, a contact spring 10 etc., of an electrical terminal 1, in particular a contact device 1 or a contact element 1, such as a spring terminal 1, a lamellar terminal 1, a tunnel terminal 1 etc., for an electrical connector 0, for example for the vehicle sector, the industrial sector, or the telecommunications sector.

Although the invention is described and illustrated in greater detail by exemplary embodiments, the invention is not limited by the disclosed exemplary embodiments, but is of a more fundamental nature.

Other variations may be derived from this without departure from the scope of protection of the invention. The invention is generally applicable in the electrical field in the case of an electrical entity. An exception to this is ground-based electrical power engineering. Only those three-dimensional portions of an object of the invention that are necessary for an understanding of the invention are represented in the drawing. Designations such as connector and counter-connector, terminal 1 and counter-terminal 5, etc. are to be interpreted as being synonymous, i.e. they may be mutually interchangeable.

Figure 1:
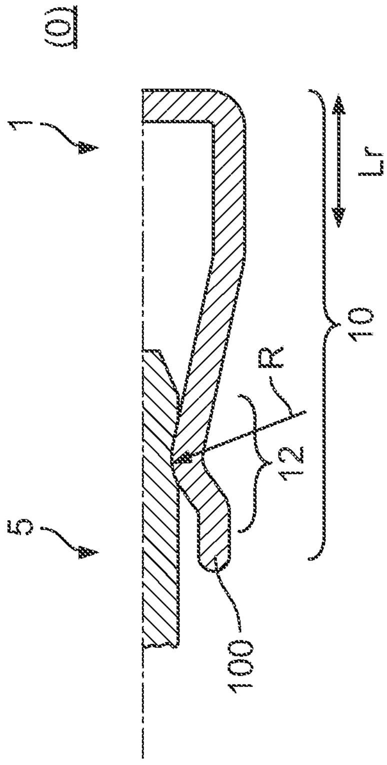
FIG. 1 is a sectional side view of a contact portion of an electrical terminal connected to a counter-terminal.

FIG. 1 shows a general contact portion 10 of a terminal 1, the contact portion 10 being seated, or bearing, in particular with mechanical preloading, against an electrical counter-terminal 5 for an electrical connector, for example for the vehicle sector. The counter-terminal 5 can be realized, for example, as a contact device 5 or a contact element 5, such as a pin terminal 5, a prong terminal 5, a tab terminal 5, a conducting track 5 of a printed circuit board, a pad 5, etc.

Figure 8:
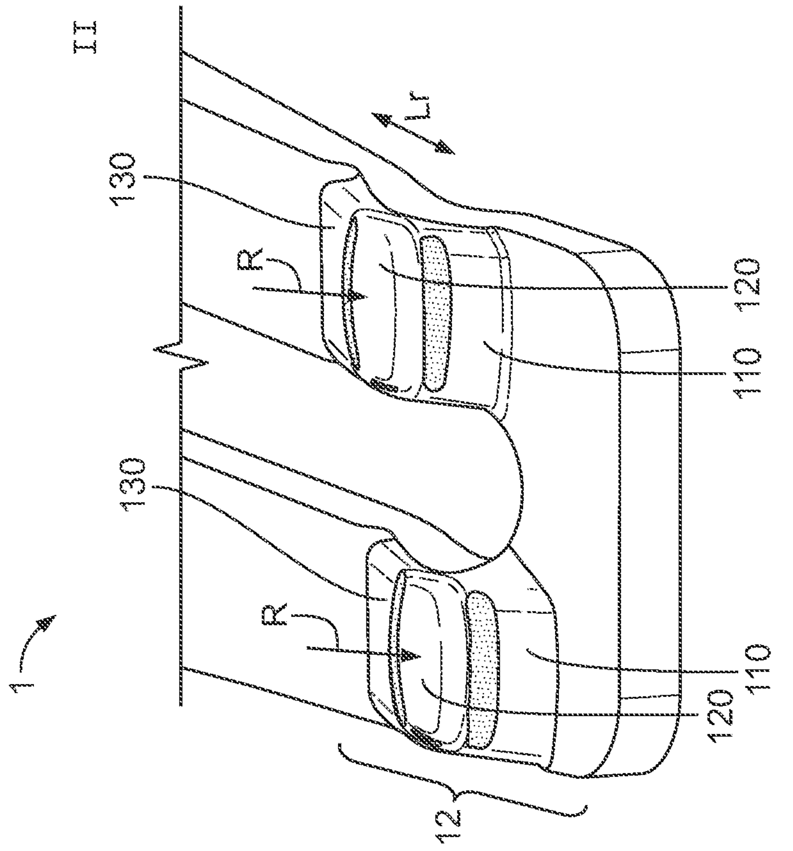
FIG. 8 is a perspective view of the terminal produced by the second step of the method with the contact dome in the contact zone.
Figure 7:
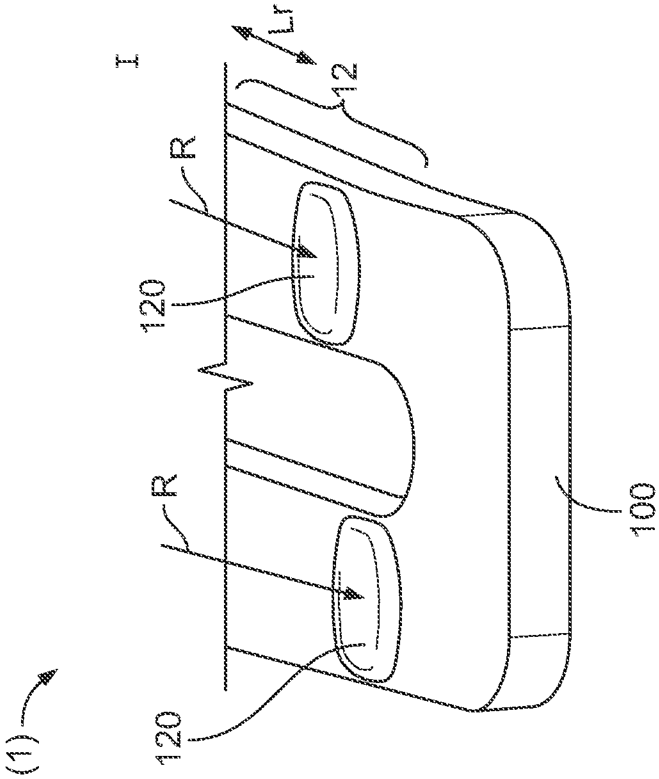
FIG. 7 is a perspective view of the terminal produced by the first step of the method with the contact dome.

In embodiments, the contact portion 10 is elongated in the longitudinal direction Lr of the terminal 1 relative to at least one of its cross-sectional dimensions. The contact portion 10 has at least one electrical contact zone 12, as shown in FIG. 1. If a plurality of contact zones 12 are configured on/in a single contact portion 10, they may be configured in parallel, as shown in FIGS. 7 and 8, and/or in series in an electrical multiple-contact zone of the contact portion 10.

Figure 4:
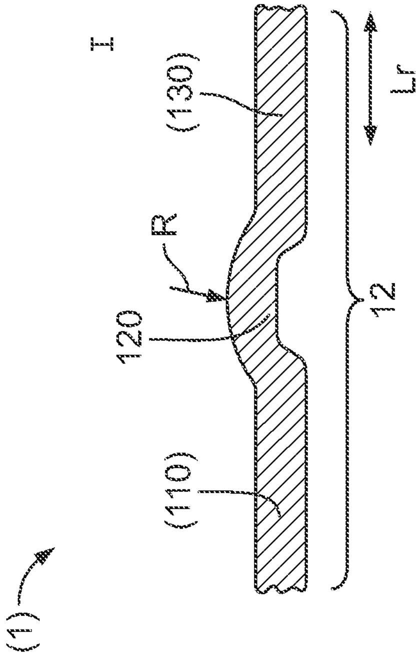
FIG. 4 is a sectional side view of the terminal produced by the first step of the method with a contact dome.
Figure 3:
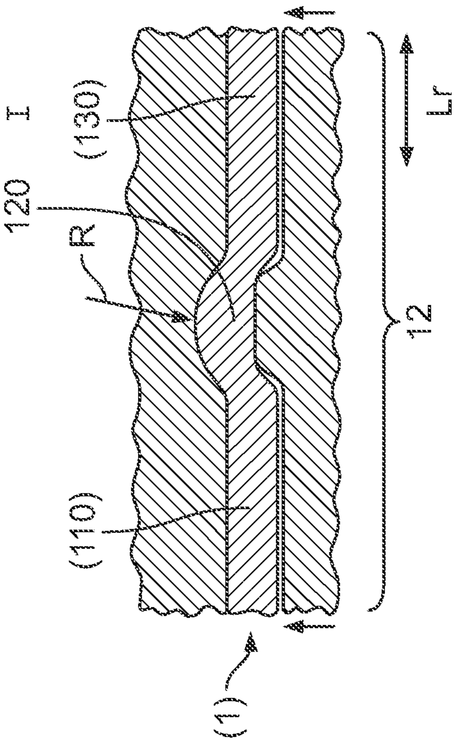
FIG. 3 is a sectional side view of a first step of a method for forming a contact zone on a terminal according to an embodiment of the invention.

In the present case, the contact portion 10 has a free mechanical end 100 shown in FIG. 1; adjoining it a free mechanical dome transition region 110; also adjoining it an electromechanical contact dome 120; and finally, adjoining it a bound mechanical dome transition region 130, which continues away from it into the terminal 1, as shown in FIGS. 3 and 4. The contact dome 120 at or within the contact zone 12, the contact portion 10 and/or the terminal 1 serves, for example, for electromechanical physical contacting or seated contacting of the electrical counter-terminal 5. The mechanical dome transition region 130 connects the contact dome 120 to a portion of the terminal 1 that is farther away, e.g. to a further mechanical transition portion, a lamella, a spring, a mechanical fastening portion, an electromechanical crimp portion or weld connection region, etc.

In an embodiment, the free mechanical dome transition region 110, with or without an insertion tongue, may adjoin the contact dome 120 forwards in the longitudinal direction Lr, and the bound dome transition region 130 may adjoin the contact dome 120 rearwards in the longitudinal direction Lr. The free dome transition region 110, or also the contact dome 120, may have, at it end portion, the free mechanical end 100 that, if necessary, may be chamfered, rounded or bevelled.

The contact zone 12 of the contact portion 10 is realized in this case by the dome transition regions 110, 130 and the contact dome 120. The two dome transition regions 110, 130 are configured, via the contact dome 120, substantially in a V-shape or U-shape in the contact portion 10. Other forms may of course be used, such as, for example, substantially only the use of a single, bound dome transition region 130, an S-shaped contact zone 12, etc.

The invention serves to reduce and/or eliminate fissures, (severe) cracks and/or delaminations, and thus to increase a quality of the contact zone 12, or contact dome 120, and therefore the reliability of a plug-in connection of a terminal 1 according to the invention and a counter-terminal 5. According to the invention, an application of preforming is effected within a sequence of an overall forming (preforming, intermediate forming and final forming) of a blank to create an entire contact zone 12, or contact portion 10, or a terminal 1.

A method for configuring the electrical contact zone 12 on/in the electrical terminal 1 will now be described in greater detail. In method according to the invention, in the terminal 1 the contact zone 12 is configured in the electromechanical contact portion 10 that extends in the longitudinal direction Lr of the terminal 1.

In a first step I of the method according to the invention (preforming step I shown in FIGS. 3, 4, and 7), a radius R, in particular an outer radius R, of the contact dome 120 is realized, in respect of time, mainly or substantially completely before a next forming step. In this case, the contact dome 120 is mainly, substantially or exclusively realized away from a dome transition region 130 or the two dome transition regions 110, 130. This first step I is, in an embodiment, a process for compression forming.

In the first step, the radius R, in particular the outer radius, in the contact zone 12 is constituted as a contact dome 120, which radius begins, at a dome transition region 110, 130 that is directly adjacent to the contact dome 120, with, for example, a maximal radius substantially equal to infinity and becomes progressively smaller down to a substantially minimal radius that is located in the central region of a contact dome 120. This minimal radius (Rmin) can be calculated, for example, according to the following formula: $Rmin=t\times a$, with t as a thickness of the contact portion 10 and a as a factor, which may be, for example, about 0.8, about 0.85, about 0.9, about 0.95, about 1.0, about 1.05, about 1.1, about 1.15, about 1.2, about 1.25, about 1.3 or about 1.5, the value of about 1.1 being preferred. A contact area A to which the contact dome 120 relates or from which the contact domes 120 are formed has a size of $A=(c\times b)/t$ with c a width of the contact dome 120, a lamella, a contact spring, b the length of the contact area and t the material thickness.

Thus, in the first step, for example, a cavity in a die may be filled with a material of the contact zone 12 in the region of the contact dome 120, without significant elongation on its contact surface, and the radius R can thus be constituted as a contact dome 120. The result is a well-formed radius R with transitions into the contact zone 12. In other words, the transitions adjoin the actual contact dome 120.

A contact geometry of the contact dome 120 may be of any shape. The contact dome 120, the contact zone 12, the contact portion 10 and/or the terminal 1 may be formed from a bare or coated (metal) sheet/strip or another type of suitable material such as, for example, a plastic or a composite material, for example having a thickness of about 0.01 mm to about 10 mm.

The result according to the invention is a radius R, in particular an outer radius, that has significantly less roughening without the occurrence of fractures and/or cracks in the contact surface of the contact dome 120. The fractures and/or cracks in the contact dome 120 in comparison with the prior art are shifted, according to the invention, into the transitions at the (outer) contact zone 12, which are subsequently subjected to significantly less mechanical stress than the contact dome 120 and where they do not detract from the intended use of the terminal 1 in question.

According to the invention, in the first step, the contact dome 120 may be constituted, by a process for compression forming or combined tensile and compression forming, in the contact zone 12 that is yet to be configured, without substantial change to the material thickness in the region of the contact dome 120 and without the occurrence of delaminations between the individual layers of a composite material or a coating and the base material. In the case of a process for compression forming, the respective region of the contact zone 12 not yet configured is plastically formed by a substantially prevailing compressive stress. In an embodiment, the region in question retains its original surface structure as a composite and in relation to the raised regions. The process for compression forming is, in an embodiment, a cold-forming process such as swaging, forging, die forming, forge forming, roll forming, indenting, embossing, taper forming and/or deep-drawing. This also means that the process for compression forming is not a process for forming by stretching and/or bending.

If only the contact dome 120 is considered, it is formed substantially in one dimension by the process for compression forming. Here, a significant dimensional change occurs in the vertical direction of the contact portion 10 and a clearly measurable change in thickness in the outer radii of the contact portion 10, whereas a dimensional change in the longitudinal direction Lr and/or transverse direction Qr is negligible, but may of course occur.

In the first step, at least one mechanical dome transition region 110, 130 adjoining the contact dome 120 may be approximately, mainly or substantially not plastically formed, apart from its mechanical transition to at least one contact dome 120. Further, substantially apart from at least one and/or exactly two substantially directly adjoining contact domes 120, plastic deformation is effected. Further, in the first step, additionally or alternatively, a main or substantial position of the dome transition region 110, 130 within a blank of the contact zone 12, of the contact portion 10 and/or of the terminal 1 may be retained. Further, in the first step, additionally or alternatively, a main or substantial position of the dome transition region 110, 130 within a blank of the contact zone 12, of the contact portion 10 and/or of the terminal 1 may be retained. Furthermore, in the first step, additionally or alternatively, a principal or substantial shape of the dome transition region 110, 130 within a blank of the contact zone 12, of the contact portion 10 and/or of the terminal 1 may be retained. In this case, the respective dome transition region 110, 130 substantially retains its original shape and position (a possible exception is a mechanical transition to the contact dome 120 being constituted). If two dome transition regions 110, 130 are configured in the contact zone 12, in the contact portion 10 and/or in the terminal 1, they substantially retain their respective shape and mutual position (angled or linear) in the first step.

In the subsequent forming step, the second step II of the method according to the invention (final forming step II, shown in FIGS. 5, 6 and 8), in particular a bend forming is performed. In this case, the contact zone 12 is mainly, substantially or exclusively deformed, such as by bending, at the contact dome 120. Instead of a bend forming, a process for combined tensile and compression forming, e.g. a deep-drawing process, may also be used. The contact dome 120 and the contact zone 12 bent at the contact dome 120 are configured in the terminal 1 by successive or time-overlapped method steps that differ from one another in respect of their deformation techniques.

According to the invention, the contact zone 12 may be deformed at the contact dome 120, in the second step, by a process for bend forming, stretch forming or combined tensile and compression forming, in the contact portion 10. In the case of a process for bend forming, the respective region of the contact zone 12 to be configured is plastically formed by a substantially prevailing bending stress. It is substantially bending stresses that have effect in a forming zone. The process for bend forming is, in an embodiment, a cold-forming process for: free bend forming, swivel bend forming, die bend forming, edge bend forming and/or roll bending—this also means that the process for bend forming is not a process for compression forming. The second step may also be stretch forming, in which case the strip thickness reduction may only be effected outside of the contact domes 120.

The first step or the process for compression forming and the second step or the process for bend forming may be delimited from each other in respect of time in such a manner that the first step or the process for compression forming and the second step or the process for bend forming overlap in time. In this case, the temporal start of the second step or of the process for bend forming may coincide, for example, with a completion of the start phase, the middle phase or an intermediate phase of the first step or of the process for compression forming. If the second step is bend forming, it may be followed by other cold-forming processes such as, for example, stretch forming, in which case the material flow is effected outside of the contact zone.

Further, the first step or the process for compression forming or deep drawing may be substantially completed, and the second step or the process for bend forming and/or stretch forming substantially started only subsequently. In this case, the temporal end of the first step or of the process for compression forming may coincide, for example, with the start of the second step or of the process for bend forming.

In the second step, at least one mechanical dome transition region 110, 130 adjoining the contact dome 120 may be approximately, mainly or substantially not plastically formed, apart from its mechanical transition to the contact dome 120. Further, in the second step, the dome transition region 110, 130 may depart from its main or substantial position within a blank of the terminal 1, of the contact portion 10 and/or of the contact zone 12. Furthermore, in the second step, the dome transition region 110, 130 may retain its main or substantial shape within a blank of the terminal 1, of a lamella, of the contact portion 10 and/or of the contact zone 12.

In the second step, at least one dome transition region 110, 130 adjoining the contact dome 120 may be bent mainly or substantially tangentially to an emerging common transition between the contact dome 120 and the dome transition region 110, 130. In the second step or in a third step of this method subsequent to the second step, a further mechanical transition, a further plug-in region, a fastening region and/or a crimp region may be configured or formed in the terminal 1. According to the invention, the method may be a time segment of a higher-order method for realizing an electrical terminal 1.

Before or after the second step, a further third step may be performed to produce the contact/terminal 1, in which case the third step may also comprise one or more sub-steps.

In an embodiment of the method represented in FIG. 3 (step I), in a die substantially only the contact dome 120 can be configured in a blank of the contact portion 10, or of the terminal 1, the blank being compression-formed. FIG. 4 (step I) shows a contact portion 10 not yet fully configured, with on the one hand the contact dome 120 having been configured, but on the other hand with the dome transition regions 110, 130 are not yet having been configured and substantially having retained their respective shape and their mutual position in the (blank of the) contact portion 10. This is also applicable to a single dome transition region 130. FIG. 7 (step I) shows a contact portion 10 that has not yet been fully configured, having two contact domes 120 arranged in parallel.

Figure 6:
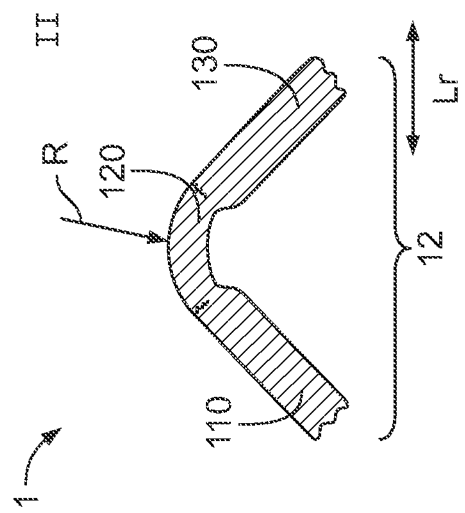
FIG. 6 is a sectional side view of the terminal produced by the second step of the method with the contact dome in a contact zone.
Figure 5:
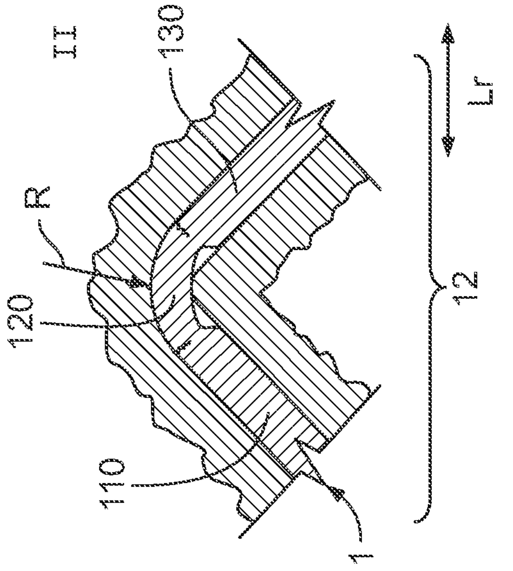
FIG. 5 is a sectional side view of a second step of a method for forming the contact zone on the terminal according to the invention.

In the time sequence represented in FIG. 5 (step II), the contact portion 10 can be deformed at the contact dome 120 in the course of the method, the blank being formed by bending or by combined tension and compression forming. In this case, the contact dome 120 is substantially not formed, or is no longer formed at all; at most, its edges in the longitudinal direction Lr are involved in this forming. FIG. 6 (step II) shows a substantially completely configured contact portion 10 FIG. 8 (step II) shows a completely configured contact portion 10 having two contact zones 12 arranged in parallel.

In FIGS. 7 and 8, the two contact domes 120 are each arranged adjacent to one another in one leg in a transverse direction Qr (see also FIGS. 10 and 11) of the terminal 1, the two legs being realized together via an integral web (partial U-shape). The two contact domes 120 may be arranged, in the longitudinal direction Lr, substantially at an identical position or offset relative to each other. For example, in the case of such an embodiment, in a third or further step following the second step II, one leg may be bent at an angle, for example a right angle, to the other leg of the terminal 1 in order, for example, to partially realize a contact cage for a counter-terminal 5.

Figure 9:
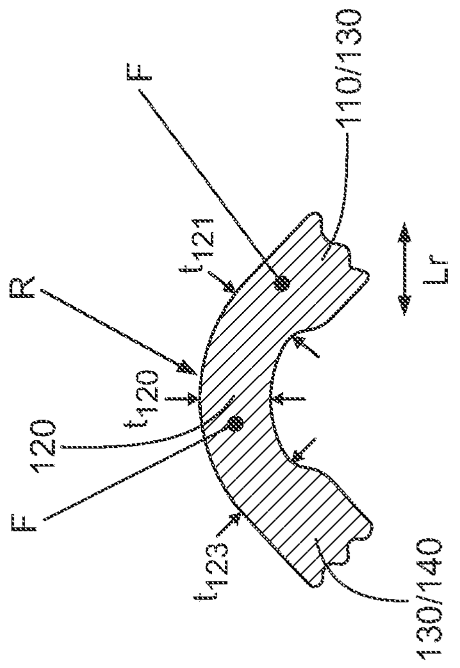
FIG. 9 is a sectional side view of the contact dome.

A thickness t120 of the contact dome 120 in its center or its central region, shown in FIG. 9, may be greater than or substantially equal to (e.g. only slightly greater than) a thickness t121, t123 of the contact zone 120 in a transition to a free mechanical dome transition region 110 or equal to a strip or metal-sheet thickness. Further, additionally or alternatively, a thickness of the contact dome 120 in its center or in its central region may be greater than or substantially equal to (e.g., only slightly greater than) a thickness of the contact zone 120 in a transition to a bound mechanical dome transition region 120. This in comparison to realizing the contact dome by a method for bend forming (invention here: compression forming), wherein the thickness of the contact dome in its center or in its central region is less than or equal to (e.g. only slightly less than) a thickness of the contact zone in a transition to a free and bound dome transition region.

Further, a thickness t120 of the contact dome in its center or in its central region shown in FIG. 9 may be less than a thickness of the free and/or bound dome transition region 110, 130, away from a respective transition to the contact dome 120. This again in comparison to a method for bend forming for which the thickness of the contact dome in its centre or in its central region is substantially equal to or greater than a thickness of the free and/or bound dome transition region.

In embodiments, as shown in FIG. 9, a ground surface, in particular a longitudinal ground surface, of the contact dome 120 or of the contact zone 12 may show flow lines F due to the compression forming and the subsequent forming steps. Flow lines F can be made visible, for example, in an ion-polished ground surface, or longitudinal ground surface. For example, a compression of the flow lines in a transition of the contact dome 120 to the free or bound dome transition region 110, 130 may be discerned. Further, at least one dome transition region 110 adjoining the contact dome 120 may merge mainly or substantially tangentially into the contact dome 120. Furthermore, the terminal 1 may have a further mechanical transition portion, a mechanical fastening portion and/or an electromechanical crimp portion or a further contact region or weld connection region, etc.

The contact portion 10 and/or the terminal 1 may be formed materially in one piece or integrally. Realization materially (adhesively) in one piece is understood to mean a realization of the contact portion 10 or of the terminal 1 whose constituent parts are fixed to each other in a materially bonded manner (welding, soldering, gluing, laminating, coating, depositing, etc.) and cannot be separated into constituent parts without damage to one of its constituent parts. The coherence in this case may also be created by a force fit and/or form fit (not in the case of integral realization). An integral realization is understood to mean a realization of the contact portion 10 or of the terminal 1 in which there is only a single component that can be divided only by destroying it. The component is produced from a single original piece (bare or coated sheet metal, blank, etc.) and/or from a single original mass (metal/plastic melt/semi-finished product/composite material), which in turn have/has an imposed integrality. Internal coherence is achieved by adhesion and/or cohesion, physical or chemical bonding. In addition in this case, there may be a full-surface or partial multi-layer or single-layer coating, a deposition and/or galvanization, etc.

Figure 10:
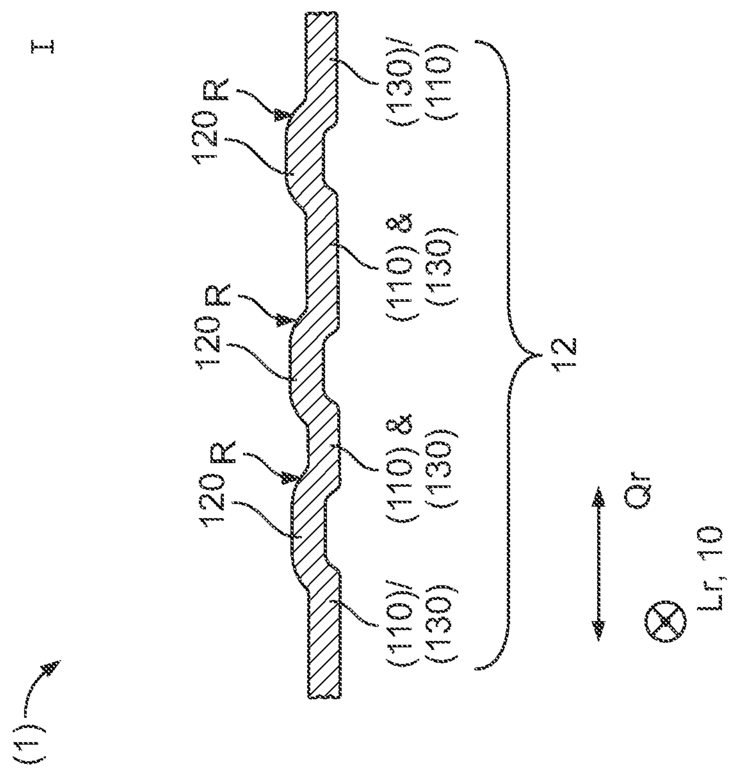
FIG. 10 is a sectional side view of a first step of a method for forming a contact zone on a terminal according to another embodiment of the invention.
Figure 11:
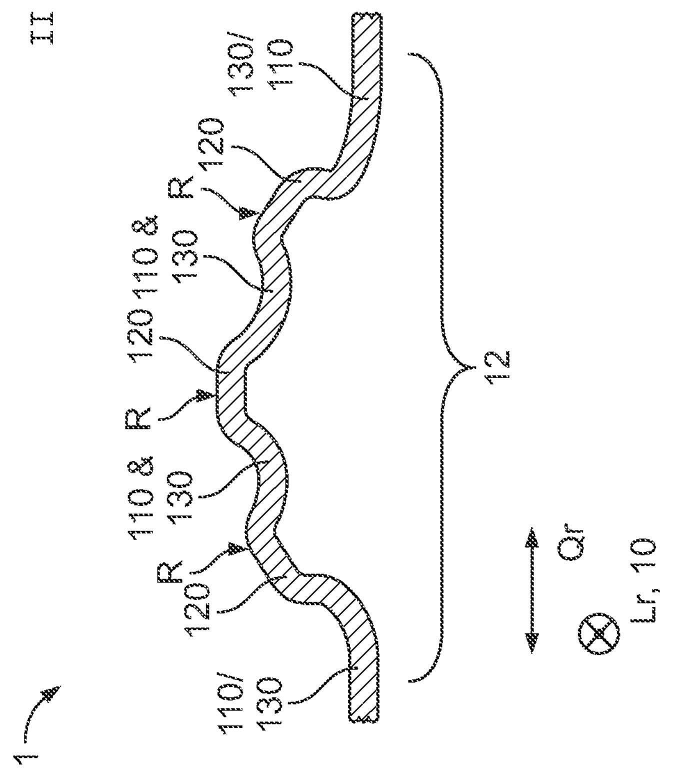
FIG. 11 is a sectional side view of a second step of the method for forming the contact zone on the terminal with a plurality of contact domes.

The third embodiment of the invention is explained in greater detail in the following on the basis of FIGS. 10 and 11, wherein, as can be seen in FIGS. 3 to 8, instead of a single contact dome 120 per material layer, leg or web in the transverse direction Qr, a plurality of contact domes 120 are, or have been, configured in the transverse direction Qr. In this case, there are three contact domes 120 configured in the transverse direction Qr, although another number, in particular two, four or five contact domes 120, may also be configured.

According to the invention, in the first step (FIG. 10), substantially only three electromechanical contact domes 120 having the radius R are constituted in the contact zone 12 that is subsequently to be configured. In other words, only contact domes 120, and not contact domes 120 that each have at least one adjoining dome transition region 110, 130, are configured. In other words, the number of contact domes 120 is of secondary importance in this formulation. This also applies analogously to the other embodiments.

Further, according to the invention, in the second step (FIG. 11), the contact zone 12 is substantially configured, in particular bent, away from its contact domes 120 in the contact portion 10. Here, in an embodiment, only at least one dome transition region 110, 130 adjacent to the respective contact dome 120 is plastically formed, i.e. substantially apart from at least one (left or right contact dome 120) and/or exactly two (middle contact dome 120) substantially directly adjoining contact domes 120.

In this case, therefore, a respective contact dome 120 is substantially no longer formed. In this case, the contact zone 12 may be bent, or have been bent, in a concave, convex, angled, etc. manner. In the present case, the contact zone 12 is formed around the longitudinal direction Lr in such a manner that the contact domes 120 of the contact zone 12 project away from the convexly curved contact zone 12. It is of course possible for a concavely curved contact zone 12 to be used here.

Moreover, it is possible in embodiments, instead of a plurality of contact domes 120 in the transverse direction Qr, to alternatively or additionally configure in a terminal 1 a plurality of contact domes 120 in the longitudinal direction Lr. In this case, the plurality of contact domes 120 in the transverse direction Qr and/or longitudinal direction Lr may be configured in a single leg, a single web, or a single material layer, in the terminal 1.

The connector 0 according to the invention comprises an electrical terminal 1, the terminal 1 being produced by a method according to the invention and/or being realized as a terminal 1 according to the invention. The connector 0 in this case may comprise, for example, a connector housing. The entity according to the invention comprises an electrical terminal 1 and/or an electrical connector 0, the terminal 1 being produced by a method according to the invention, and/or the terminal 1 and/or the connector 0 being realized according to the invention. The entity in this case may further comprise, for example, in addition to an entity housing, a mechanical, fluidic, electrical, electronic and/or optical entity. Such an entity may be realized, for example, as an electrical device, an electrical means, an assembled electrical cable, an electrical assembly, an electrical printed circuit board, an electrical component, an electrical module, an item of electrical equipment, an item of electrical apparatus, an electrical unit, an electrical installation, an electrical system, etc.

According to the invention, a reduction or elimination of fissures, (severe) cracks and/or delaminations in a coating in the contact zones/the contact dome of electrical terminals is achieved. With this forming concept according to the invention, it is possible to perform/realize additional structuring processes or multiple-contact domes without a negative overstressing of a material of the terminals, without thereby causing fissures, (severe) cracks and delaminations in a coating. The terminals 1 and the connectors according to the invention are to be such that they can be produced inexpensively with respect to their subsequent use, and are to be simple to construct and/or easy to handle, and have a greater reliability if the contact dome 120 is realized so as to have substantially no cracks.

What is claimed is:

1. An electrical connector, comprising:

an electrical terminal having an upper surface including a distal end and a spring arm extending in a proximal direction, and a contact portion between the distal end and the spring arm having a contact zone with a plurality of contact domes aligned in a transverse direction across the upper surface, wherein each of the respective contact domes is adjacent a contact zone and is configured to bend away from a corresponding contact dome wherein a lower surface of the spring arm is disposed below a lower surface of the distal end, a surface of one of the plurality of contact domes has a plurality of flow lines due to compression forming.

2. The electrical connector of claim 1, wherein each of the respective contact domes has a minimum radius calculated by multiplying a material thickness of the contact portion by a factor with a value between 0.8 and 1.5.

3. The electrical connector of claim 2 wherein the factor has a value of about 1.1.

4. The electrical connector of claim 1, wherein a transition region adjoining one of the plurality of contact domes merges tangentially into the contact dome.

5. The electrical connector of claim 1, wherein the contact portion is formed materially in one piece or integrally.

6. The electrical connector of claim 1, wherein the contact portion is elongated in a longitudinal direction and is a contact lamella or a contact spring.

7. The electrical connector of claim 1, wherein the contact portion has an additional contact zone that is parallel or in series with the contact zone.

8. An electrical terminal, comprising:

an upper surface including a distal end and a spring arm extending in a proximal direction, and a contact portion between the distal end and the spring arm having a contact zone with a plurality of contact domes aligned in a transverse direction across the upper surface, wherein each of the respective contact domes is adjacent a contact zone and is configured to bend away from a corresponding contact dome wherein a lower surface of the spring arm is disposed below a lower surface of the distal end, a surface of one of the plurality of contact domes has a plurality of flow lines due to compression forming.

9. The electrical terminal of claim 8, wherein each of the respective contact domes has a minimum radius calculated by multiplying a material thickness of the contact portion by a factor with a value between 0.8 and 1.5.

10. The electrical connector of claim 9 wherein the factor has a value of about 1.1.

* * * * *